United States Patent [19]

Hundebol

[11] Patent Number: 4,555,388
[45] Date of Patent: Nov. 26, 1985

[54] METHOD AND APPARATUS FOR CALCINING RAW PHOSPHATE MATERIAL

[75] Inventor: Soren Hundebol, Copenhagen, Denmark

[73] Assignee: F. L. Smidth & Co. A/S, Denmark

[21] Appl. No.: 558,117

[22] Filed: Dec. 5, 1983

[30] Foreign Application Priority Data

Dec. 7, 1982 [DK] Denmark .............................. 5408/82

[51] Int. Cl.$^4$ .......................... C01F 5/00; C01F 11/00; C01B 25/26; F27B 15/00
[52] U.S. Cl. .................................... 423/167; 422/142; 422/145; 422/147; 423/DIG. 16; 432/14; 432/15; 432/58
[58] Field of Search ...................... 423/167, DIG. 16; 71/44, 47, 53; 432/14, 15, 58; 422/141, 142, 145, 146, 147

[56] References Cited

U.S. PATENT DOCUMENTS

| | | | |
|---|---|---|---|
| 3,995,987 | 12/1976 | MacAskill | 432/15 |
| 4,025,295 | 5/1977 | Touborg | 432/14 |
| 4,389,380 | 6/1983 | Parks | 423/167 |

Primary Examiner—Howard S. Williams
Attorney, Agent, or Firm—Brumbaugh, Graves, Donohue & Raymond

[57] ABSTRACT

Raw phosphate material is calcined to remove pollutants, such as organic compounds and sulphides, by heat treatment in two suspension calciners (3,5) arranged in series. Fuel supplied at burners (8) is burnt in the calciners with air, supplied in parallel through pipes (9) from a cooler (7) for the treated material. The material is preheated in a preheater, for instance a pipe (13) and cyclone (2) by exit gases from the calciner before entering the calciners and, after leaving the calciners, is separated from the gas streams in separators (4,6).

6 Claims, 1 Drawing Figure

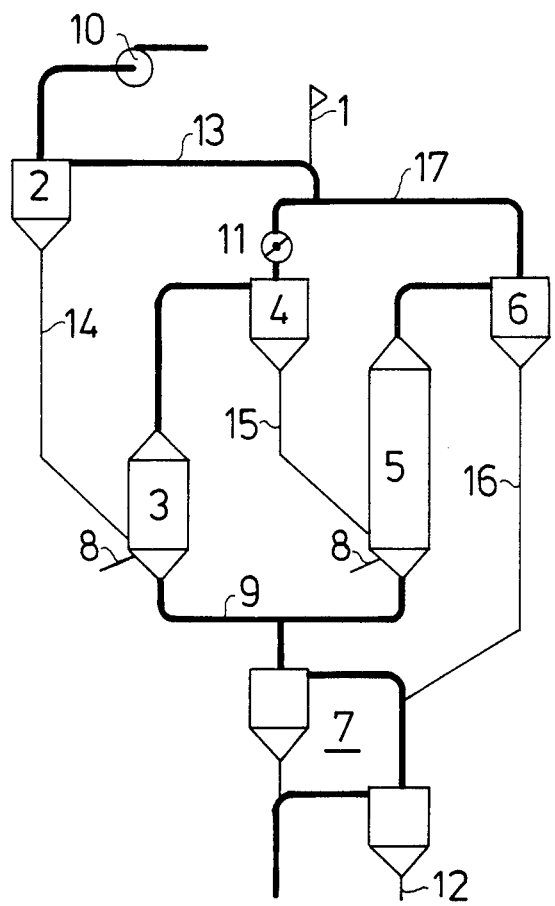

METHOD AND APPARATUS FOR CALCINING RAW PHOSPHATE MATERIAL

Raw phosphate material often contains pollutants in an amount which may prevent it from being used directly e.g. for the production of phosphate acid according to the wet process. The invention relates to a method and an apparatus for calcining raw phosphate material, i.e. removal of organic components and expulsion of $CO_2$ and also removal of sulphides, from the raw phosphate material by burning in a suspension consisting of the raw material, fuel and air.

It is known to remove such pollutants through calcination as their calorific value may contribute considerably to the amount of calories necessary for drying and heating the material, which usually is carbonate-apatite. Such known methods may involve calcining in fluid-bed reactors, see, e.g. U.S. Pat. No. 3,995,987, or calcining in one stage in a suspension reactor, see, e.g. FR-A-2486924. The use of fluid-bed reactors entails, however, substantial capital investment in equipment and calls for a large power consumption to surmount the heavy pressure losses arising during the process, whereas the use of a one-stage suspension reactor plant, in spite of cheaper initial and working costs, entails a risk of sulphite formation upon reduction of sulphurous minerals and of various metal ions being reduced from a high oxidation level to a lower one. A calcined product having a high sulphide content and additionally containing other reducing compounds, is poorly suited for producing phosphoric acid according to the wet process as the reducing compounds may cause corrosion on vital parts in a phosphoric acid plant.

Consequently, it is the object of the invention to devise a method and an apparatus for burning away pollutants, particularly the precursors of reducing compounds in raw phosphate material (carbonate-apatite), by which the above drawbacks are eliminated.

According to the invention, a method of calcining raw phosphate material containing organic compounds and sulphide pollutants is characterised in that the material is heat treated in two stages, each taking place in a suspension reactor in which raw material is suspended and conveyed in a gas flow which flows at a velocity of at least 2 m/sec., and to which gas flow fuel is supplied so that the organic components and the sulphide in the raw material are burnt together with the fuel; the treated material leaving each reactor partly suspended in the gas flow and being separated by means of at least one separator; and combustion air being passed in parallel through the two stages.

The invention also includes apparatus for carrying out the new method, the apparatus being characterised by two series-coupled suspension calciners of which a first and smaller one constitutes the first reactor stage and the second and larger one constitutes the second reactor stage; at least one separator for separating the material which has been treated in each calciner from the gas flow; a cooler coupled after the second calciner for cooling the treated material; pipes for conveying the treated material partly in suspension, and pipes for supplying in parallel the two calciners with spent cooler air as combustion air.

By use of suspension calciners there is achieved a plug flow effect of the suspension in the reactor, provided it is of the type in which raw material and fuel are introduced at or near the bottom. The plug flow effect in the suspension calciner makes it possible to control the retention time for the material treated in the reactor so that all the particles are given approximately the same retention time. As the sulphide content in the individual particulars depends on the particle retention time in the reactor (short retention time—high sulphide content, long retention time—low sulphide content), the retention time in the calciner is optimised to achieve a low sulphide content in the product. In calciners with a complete mixing effect such as fluid-bed calciners or suspension calciners with fuel supply at the top the retention time of the individual particles in the reactor ranges from an extremely short to an extremely long retention time. As a result, particles getting a very short retention time, causing maximum sulphide content, have to be diluted after the calcining process with particles having had a long retention time to achieve a product having at least an average sulphide content.

The removal of sulphide presupposes the presence of oxygen, and if the calcining takes place in an atmosphere having a high oxygen percentage the decomposition of sulphide is accelerated. If the calcining were thus to take place in one reactor the reactor would have to operate with a high oxygen percentage, which impairs the heat economy, and have to be of considerable size. In contrast, according to the invention, the process takes place in two stages by using two calciners or reactors of comparatively modest size.

BRIEF DESCRIPTION OF DRAWING

The invention will now be explained in more detail by reference to the accompanying drawing which shows diagrammatically an example of a two-stage calcining plant.

The plant has a first 3 and a second 5 reactor, which are series-coupled and are both suspension or "flash"-calciners with supply of combustion air, raw material and fuel at or near the bottom. Raw material is supplied via pipes 14 and 15, respectively, while fluid or gaseous fuel is supplied via burners 8. Combustion air is introduced in parallel into the calciners via pipes 9 from a cooler 7 coupled after the second calciner 5. In the example shown the cooler is a cyclone cooler. Raw material is fed to the plant at an inlet 1 and preheated in a pipe 13 and a cyclone 2 by the calciner exit gases supplied via a pipe system 17. A fan 10 in connection with an adjustable gate 11 controls the air/gas flow through the plant. The finished calcined product is discharged from the plant at an outlet 12.

During the process the preheated and dried raw material, i.e. carbonate-apatite raw phosphate, is fed to the first reactor 3 to be heated therein to a calcining temperature of 700°–850° C., at which the majority of the organic components contained in the raw material is burnt. The retention time of the material in the first and smaller reactor is relatively short and limited to between 1.5 and 4 seconds. As a result, the sulphile content in the treated material increases approximately to maximum. The excess oxygen percentages in the reactor 3 has no influence on this, and consequently this reactor operates with a low excess oxygen percentage of 0 to 3, and therefore with a limited air surplus, which is regulated by means of the fan 10 and the gate 11. From the reactor 3 the hot material containing a residual amount of organic components and sulphide is passed via a separator 4 to the somewhat larger second reactor 5, having a relatively long material retention time of at least twice the retention time in the first reactor 3. The reactor 5 operates with a high excess oxygen percentage which in practice is at least twice as high as the excess oxygen percentage in this reactor 3, and in a similar temperature range of 700°–850° C. The high oxygen percentage is achieved in that the treated material at its introduction into the reactor 5 already has a high temperature, resulting in a low oxygen consumption for combustion of fuel in that reactor. The high oxygen percentage ensures optimum removal of the residual amount of organic components and sulphide. From the reactor 5 the material is passed via a separator 6 to the cooler 7, prior to being discharged as calcined product at the outlet 12. The spent, hot cooler air is reused as combustion air in the reactors.

Experiments with the process have shown that the choice of the calcining temperature in the two reactors constitutes a critical parameter, as for each raw material there is only one optimum reaction temperature. If the chosen temperature is too high it will cause sintering together and rearrangement of the crystals in the treated conglomerate of carbonate-apatite, whereby the pores and cracks in the conglomerate are gradually closed, thus preventing the oxygen molecules from penetrating to the organic components and the sulphide to the converted. If too low a temperature is chosen, the desired processes will proceed slowly and demand a very long retention time in the reactors, and at the same time the low temperature does not ensure sulphide removal at the same rate that causes formation of new sulphide in the material.

The optimum reaction temperature for the process must thus be sought in the range 700°–850° C., the lowest temperature being chosen for geologically young raw phosphates, and the highest for old raw phosphates. Furthermore it has been found that this optimum temperature serves to retain a suitable residual $CO_2$ content in the carbonate-apatite, by which is ensured a suitable reactivity in the "attack"-tank used for the phosphoric acid production. In addition the $CO_2$ developed by contact with the acid can contribute towards a desired cooling during the acid production.

The following experimental data are examples of what can be achieved by two-stage calcining as compared with one-stage calcining:

|  | C | % sulphide | % $CO_2$ | % $P_2O_5$ | BET($m^2/g$) |
| --- | --- | --- | --- | --- | --- |
| Basic material, dry | 1.8 | 0.02 | 5.3 | 30.5 | 15.0 |
| Calcined once at 750° C., 2 sec. | 0.40 | 0.08 | 4.8 | 32.5 | 8.0 |
| Calcined once at 900° C., 2 sec. | 0.09 | 0.23 | 1.5 | 34.4 | 0.6 |
| Two-staged treated at 750° C., 2 + 6 sec. | 0.07 | 0.06 | 1.7 | 34.0 | 1.7 |

BET is the International unit for measurement of internal surface of particles.

The basic material is Moroccan Youssoufia-phosphate which further has a moisture content of 15–18%, which must be dried away before calcination is initiated. By one-stage flash treatment it is possible at approximately 750° to achieve a product which is fairly acceptable as to sulphide, but the carbon and $CO_2$ content are high. Attempts to decompose the latter by raising the temperature e.g. to 900° C. will cause the sulphide content to grow markedly. A similar effect appears when increasing the retention time two or three times. Only by the two-stage treatment are simultaneously achieved both acceptable carbon ($CO_2$) and sulphide levels.

I claim:
1. A method of calcining raw phosphate material containing organic compound and sulphide pollutants, comprising
   (a) introducing the material to be calcined into a first stage suspension reactor, suspending and conveying said raw material in a gas flow of combustion air which flows at a velocity of at least 2 m/sec, and supplying fuel to said gas flow whereby the main part of the said organic components is burnt together with said fuel at a reaction temperature of between 700° and 850° C., and maintaining the oxygen surplus in the reactor in the range of 0–3%, and retaining the said material in the first stage reactor for at least 1.5 secs,
   (b) removing the material from the reactor and separating the material from the gas flow in a separator,
   (c) introducing the material into a second stage reactor after the material has been heated in said first stage reactor, the second stage reactor being a suspension reactor, suspending and conveying said preheated raw material in a gas flow of combustion air which flows at a velocity of at least 2 m/sec, and supplying fuel to said gas flow whereby remaining organic components and sulphides are burnt together with said fuel; the reaction temperature being between 700° and 850° C.; and maintaining the oxygen surplus in the second stage which is larger than and at least double of that of the first stage, the retention time of the second stage being at least double of the retention time of the first stage, and
   (d) discharging the material from said second stage.
2. A method according to claim 1, wherein said gas flow from each of said two reactor stages is used for drying and preheating said raw material prior to said material being passed to said first reactor stage.
3. Apparatus for calcining raw phosphate material containing organic compound and sulphide pollutants comprising a first suspension calciner and a second suspension calciner, said calciners being series-coupled, said first calciner being smaller than the second calciner; at least one separator for separating said material which has been treated in said calciners from a gas flow used to suspend said material in said suspension calciners; a cooler coupled after said second calciner for cooling said material after said treatment thereof; pipes for conveying said treated material partly in suspension; and pipes for supplying in parallel said two calciners with spent cooler air as combustion air.
4. Apparatus according to claim 3, further comprising means for utilising hot exit gases from said calciners for preheating said raw material.
5. Apparatus according to claim 3, further comprising means for supplying fuel, combustion air and material at or near the bottom of each of said calciners.
6. A method of calcining raw phosphate material comprising organic compound and sulphide pollutants, comprising
   (a) introducing the material to be calcined into a first stage suspension reactor, suspending and conveying said raw material in a gas flow of combustion air which flows at a velocity of at least 2 m/sec, and supplying fuel to said gas flow whereby the main part of said organic components are burnt together with said fuel at a reaction temperature of between 700° and 850° C., and maintaining the oxygen surplus in the reactor in the range of 0–3%, and retaining the said material in the first stage reactor from 1.5 to 4 secs, (b) removing the material from the reactor and separating the material from the gas flow in a separator, (c) introducing the material into a second stage reactor after the material has been heated in said first stage reactor, the second stage reactor being a suspension reactor, suspending and conveying said preheated raw material in a gas flow of combustion air which flows at a velocity of at least 2 m/sec, and supplying fuel to said gas flow whereby remaining organic components and sulphides are burnt together with said fuel; the reaction temperature being between 700° and 850° C.; and maintaining the oxygen surplus in the second stage which is larger than and at least double of that of the first stage, the retention time of the second stage being at least double of the retention time of the first stage, and (d) discharging the material from said second stage.

* * * * *